Figure 1:
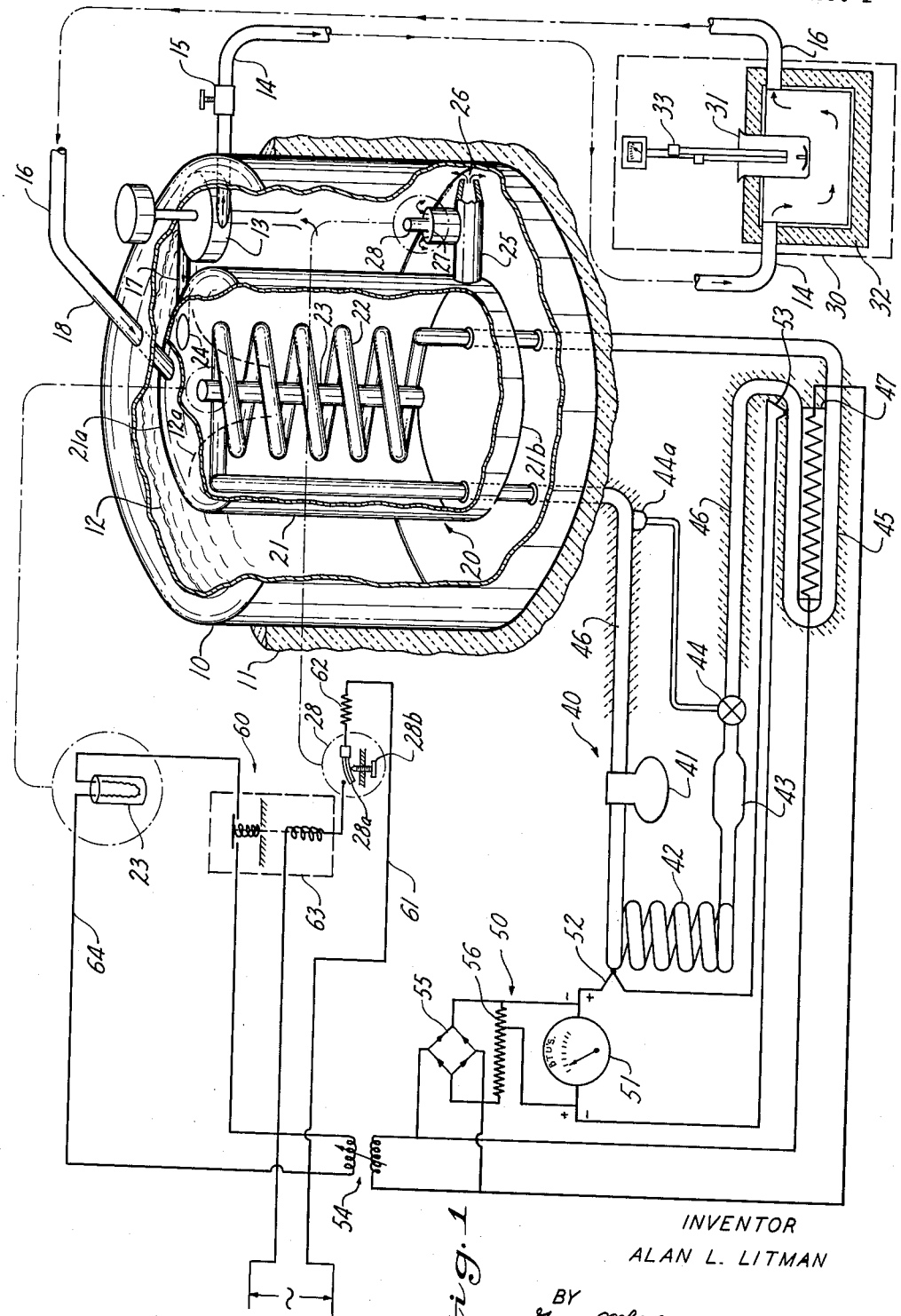

Jan. 4, 1966

A. L. LITMAN 3,227,207

THERMAL ENVIRONMENTAL CONTROL APPARATUS

Filed March 4, 1963

2 Sheets-Sheet 1

INVENTOR
ALAN L. LITMAN

BY
Green, McCallister & Miller

HIS ATTORNEYS

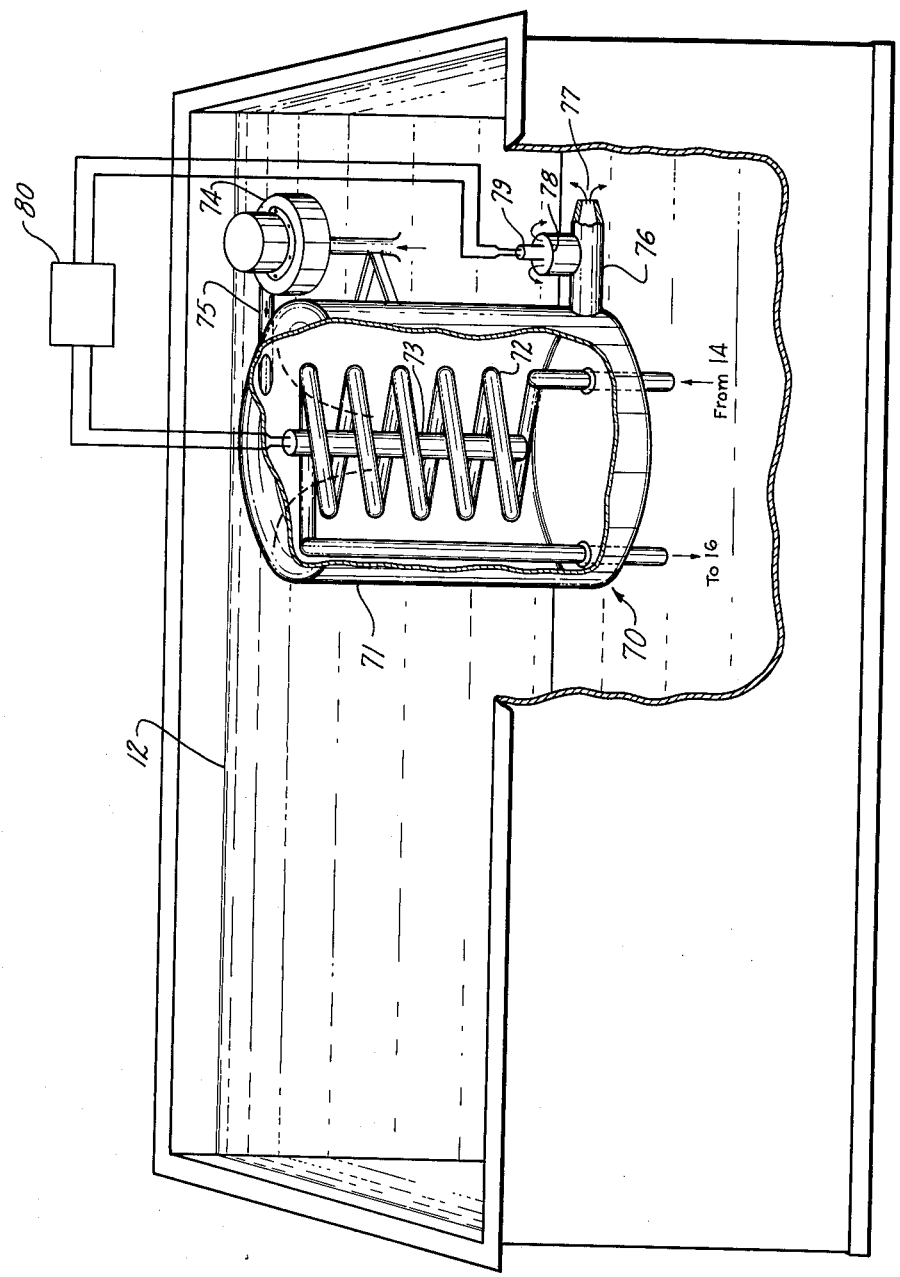

United States Patent Office 3,227,207
Patented Jan. 4, 1966

3,227,207
THERMAL ENVIRONMENTAL CONTROL APPARATUS
Alan L. Litman, 114 Hartwood Drive, Pittsburgh, Pa.
Filed Mar. 4, 1963, Ser. No. 262,755
8 Claims. (Cl. 165—11)

This invention relates to apparatus and procedure for controlling the thermal environment of laboratory equipment such as used in biochemical, physical and other scientific research. More specifically, this invention relates to apparatus and procedure for providing a source of circulating liquid that has an accurately controlled temperature for accurately maintaining the operating temperature of laboratory equipment.

Many fields of modern scientific research have developed needs for highly accurate thermal environmental controls for instruments and processes that operate within a moderately wide range around ordinary room temperature. For example, chambers for differential crystallizations, and for the determination of pH require highly accurate constant thermal environments. Also heat sinks for calorimetry purposes require accurate reference temperature control if results are to be accurate and reproducible. One especially important need for highly accurate temperature control is the cell compartment of a spectrophotometer.

In the past, accurate control of environmental below ambient temperatures, has involved the use of an ordinary compressor refrigeration system. Compression refrigeration systems and their inherent operating characteristics are well known in the mechanical arts. It is known that the heat pumping or cooling capacity of a compression refrigeration system varies directly with the operating or output temperature of the system. Thus, a system capable of providing a significant cooling capacity when operating at a low temperature will have a relatively high cooling capacity when operating at higher temperatures. On the other hand, low temperature operation will normally require higher cooling capacity, due to increased atmospheric heat absorption, than higher temperature operations. It will thus be seen that high excess cooling capacity is likely to exist in a compression refrigeration system operating at above-minimum temperatures. In order to use such a system for the higher temperature operation, it is necessary either to run the system only part of the time, or to run the system continuously and provide an additional artificial load to take up the excess cooling capacity and thereby to maintain the desired higher temperature. Frequent start-and-stop switching of the compressor to run the system only part of the time is always injurious to the compressor and introduces time lags that adversely affect the constancy of control.

Accordingly, existing circulating liquid environmental controllers have chosen the latter mode of handling excess cooling capacity by adding heat directly to a reservoir pool of circulating liquid while at the same time removing heat from the pool by the evaporator of the compression system. I have determined that the heat transfer efficiency of such an arrangement is undesirably low, thus creating and maintaining thermal lags and thermal gradients between the heat source and the heat sink within the reservoir which inherently prevent the system from providing a highly accurate temperature control. In fact, existing systems have been able to allow a maximum accuracy of about ±.02° C. and a minimum hunting temperature change or lack of temperature constancy of .02° C. or more. Furthermore, the existing baths that can produce the best available accuracy and constancy, employ relatively complicated, and hence expensive equipment, the less expensive and more simply constructed equipment is greatly inferior in performance to that herein indicated.

Accordingly, it has been an object of my invention to fully investigate the requirements of accurate temperature control by a circulating liquid environment controller and the physical problems relating thereto.

Another object of my invention has been to provide a highly accurate environment controller that employs relatively simple equipment and therefore can be economically produced.

Another important object of my invention has been to provide a circulating liquid environment controller that is capable of maintaining a selected temperature within ±.003° C. throughout a moderately wide range of temperature without fear of injury to or instability of the system.

A further object of my invention has been to provide an environment controller that is calibrated in terms of desired cooling capacity whereby at any operating temperature a cooling capacity can be preselected that will roughly approximate the cooling capacity required for the particular load on the system.

A further important object of my invention has been to provide an environmental controller which can be programmed to vary the temperature up or down according to a predetermined time schedule by the use of simple electro-mechanical analog devices.

These and other objects of my invention will appear to those skilled in the art upon reading and understanding the following disclosure of the novel concepts of my invention and an illustrative embodiment thereof.

One phase of my invention involves the use of a continuously running compression refrigeration system wherein the cooling capacity of the system is adjusted to the load, as necessary, by a cooling capacity adjustment heater which adds a controlled amount of heat directly to the refrigerant, thus evaporating nearly all of the refrigerant that is not needed to provide the required cooling capacity necessary to handle the particular load. By such construction my system can employ a continuously operating compressor and still completely avoid the thermal gradients and thermal time lags inherent in existing systems wherein all supplemental heat is added directly to the circulating liquid.

Another phase of my invention involves the use of a relatively small thermal control unit wherein off-temperature circulating liquid returned from the controlled equipment is violently agitated by a vortex flow, in a close moving association with the refrigeration evaporator of the compression refrigeration system and simultaneously in a heat exchange relationship with an infrared heater that provides the fine or vernier control of the circulating liquid temperature. The vortex flow is created in part by the velocity of return liquid itself, which is supplemented by a by-pass flow from a liquid circulating pump. In use the circulating flow is often throttled to avoid high velocities in the load equipment. Throttling can reduce the return flow to a point where it could not by itself maintain a sufficiently turbulent vortex to provide an adequate heat exchange relationship with the refrigeration evaporator. The by-pass flow from the circulating pump varies as an inverse function of the circulating flow as controlled by external throttling, so that under all conditions the combined return and by-pass flows are sufficient to maintain a highly turbulent vortex moving past the temperature-correcting elements. By mixing returning flow with a small amount of correct temperature supply liquid, the temperature differential or gradients are tempered, thus minimizing the possibility of control overshoot and hunting that is caused by large temperature errors. Conveniently, the corrected flow moves past a variable datum thermal-electric transducer which controls the vernier infrared heater to accurately maintain the circulating liquid temperature. Supply liquid flow from the thermal control unit moves into a main reservoir of circulating supply liquid to gently stir the supply and eliminate any minor thermal gradients that may exist therein.

One important advantageous result achieved by the use of my thermal control unit, is the elimination of a large thermal mass of circulating liquid that previously has been required to temper errors due to thermal lags and temperature gradients inherent in previous environmental controls. For example, existing controllers employ circulating liquid volumes of between 4 and 7 gallons whereas my system requires only about ⅔ of a gallon or only as much liquid as is necessary to completely immerse my thermal control unit and provide a continuous supply through a remote research project. The greatly reduced thermal mass employed in my controller permits rapidly changing time-temperature schedules that are impossible to attain using existing equipment.

A further phase of this invention relates to the use of a cooling capacity adjustment system that includes means responsive to the gross available cooling capacity of the system for the particular temperature at which it is operating, and also means responsive to the heat added to the refrigerant by the cooling capacity adjustment heater. Information from the two means is operatively combined in a mutually opposed or subtractive relationship, and applied to a visual indicating device, such as a galvanometer calibrated in heat units such as B.t.u.'s, which indicates the difference therebetween or the effective available cooling capacity of the system. As the operation of the cooling capacity adjustment heater is manually controlled, my indicating device will respond to manual adjustment of the heater to indicate selected cooling capacity which can easily be compared to that required for a particular load.

These phases or inventive concepts of my invention will be better understood by referring to the following description of a preferred illustrative embodiment of my invention wherein specific reference is made to the accompanying drawing, of which:

FIGURE 1 shows a circulating liquid environmental temperature controller constructed in accordance with my invention and connected to typical research apparatus; and FIGURE 2 shows an auxiliary thermal control unit that may be used in conjunction with the controller of FIGURE 1 for specific applications requiring control of a large thermal mass.

More specifically, in FIGURE 1 there is shown a circulating liquid supply tank or reservoir 10 that is thermally insulated on all sides by a formed-in-place material 11 such as a halocarbon blown urethane foam. A pool or supply of environmental control liquid 12 (preferably a water and ethylene glycol mixture for the ordinary temperature range of −20° C. to +50° C.) within the reservoir 10 is maintained at an accurately controlled temperature by a heat exchange device or thermal control unit 20. The liquid 12 is circulated through a load such as research equipment by a continuously running centrifugal pump 13 that is submerged in the pool within the reservoir 10. The pump 13 delivers liquid from the tank and through a supply conduit or delivery hose 14 that may be throttled by a screw clamp 15, to the experimental or research equipment requiring highly accurate environmental temperature control.

In FIGURE 1 a pH meter 30 is shown as a typical load requiring a circulating environmental control liquid. The pH meter 30 has a cell or beaker 31 mounted in a ducted insulated housing 32, and electrical sensing equipment 33 that responds to pH. The beaker 31 contains a substance whose pH is in question. The accuracy or useful resolution of the electrical sensing equipment 33 is limited by accuracy of the maintained substance temperature which is dependent upon the accuracy of the temperature of the circulating liquid moving in the ducted shell 32. After circulating through the load, the liquid 12 is returned by a return hose or conduit 16 to the thermal control unit 20 which brings the temperature of the returned liquid back to the desired constant temperature of the supply liquid.

The thermal control unit 20 comprises an elongated generally cylindrical, vertically-extending enclosed vortex chamber or shell 21 having a top wall 21a and a bottom wall 21b. Within the shell 21 is mounted a concentric, vertically-extending cooling coil or refrigeration evaporator 22 and an electrically energized infrared heat source or vernier heater 23 that is positioned along the core or axis of the refrigeration evaporator 22. Adjacent the top of the shell 21 is a side-wall tangential inlet opening 24 that is connected to provide flow communication between a secondary discharge or by-pass outlet duct 17 from the circulating pump 13 and the interior of the shell 21. The return conduit 16 has a terminal or shell entrance portion 18 that enters the shell 21 through its top wall 21a at a high angle thereto and just downstream of the tangential by-pass inlet opening 24. The by-pass flow from conduit 17 and the return flow from the entrance position 18 of the conduit 16 combine in moving around the inner cylindrical wall of the shell 21 to form a high turbulent vortex 12a that permits intimate agitated contact between the liquid mixture and the refrigeration evaporator 22 such that the heat transfer efficiency therebetween is maximized. The infrared heater 23 is designed to emit heat in the wavelength range of 3 to 5 microns, which wavelength is readily absorbed by the liquid as it moves downwardly through the shell 21.

The liquid vortex 12a moves downwardly to the bottom of the shell 21, receiving or delivering a controlled amount of heat from the combined cooling and heating elements 22 and 23 as it goes, and is discharged through an outlet tube 25 into the main pool of the supply liquid. The outlet tube 25 preferably includes at least two outlet openings or flow orifices; a main outlet opening or nozzle 26 which discharges a major portion of the thermally corrected liquid into the reservoir 10; and a secondary outlet opening 27 in which is supported a thermal sensing element, variable datum thermostat or thermo electric transducer 28, such as a bi-metallic strip, mercury contact thermometer or a thermister. The secondary opening 27 permits a minor portion of the flow to move agitatedly past the transducer 28 to provide accurate sensing of the discharge temperature. As explained hereinafter in detail, the transducer 28 in the outlet tube 25 controls the operation of the infrared heating element 23 to provide a fine or vernier control of the supply liquid temperature.

The by-pass flow from the centrifugal circulating pump 13 will supplement the return flow from the conduit portion 18 in an amount that is inversely related to the amount of return flow, so that an adequate and relatively constant volume and velocity of vortex flow 12a will be maintained at all times. Accordingly, adjustment of the screw clamp 15 does not upset the operation of my device.

The refrigeration evaporator coil 22 of the thermal control unit 20, in itself, may be considered a rather ordinary component of a somewhat extraordinary refrigeration system 40. The refrigeration system 40 includes an ordinary positive displacement compressor 41, a condensor or heat rejection device 42, an accumulator or liquid refrigerant reservoir 43, a conventional thermostatic expansion valve 44 that is made responsive to the degree of superheat of refrigerant leaving the refrigeration evaporator coil 22 by means of thermal sensing means or bulb 44a, a primary heater or cooling capacity adjustment evaporator 45 and the refrigeration evaporator coil 22 that receives refrigerant from the cooling capacity adjustment evaporator 45 and returns spent refrigerant to the compressor 41. The various refrigeration components are hermetically connected into a refrigerant flow path by suitable thermally insulated conduits or ducting 46.

A cooling capacity reducer such as an electrical resistance heater 47 is connected in intimate contact with the cooling capacity adjustment evaporator 45 of the refrigeration system 40. As hereinafter explained, the amount of heat released by the heater 47 is preset by the operator in accordance with the desired operating thermal load of the particular research project with which the controller is employed. The thermal load is a predeterminable function of the operating temperature, heat transfer characteristics, and any exothermic or endothermic reaction associated with the project.

I have devised an indicating circuit 50 which will simplify the adjustment of the system cooling capacity once the heat load characteristics of the research device have been empirically determined. The indicating circuit 50 includes a galvanometer or other visual indicator 51 that is placed in operative electrical contact with a differential temperature transducer such as a pair of thermopiles or thermocouples 52 and 53 which are located to sense respectively the temperature at the inlet of the condenser 42 and the temperature at the inlet of the first evaporative stage, which is the capacity adjustment evaporator 45. The thermocouples 52 and 53 thus produce a voltage that is polarized as shown in the drawings and has a magnitude that is a function of the gross cooling capacity of the refrigeration system. It is desirable to make the visual indicator 51 show the instantaneous available cooling capacity of the evaporator 22, to permit set-up of the system such that it runs as nearly as possible in an equilibrium condition and thereby avoids continuous hunting that occurs whenever a thermal system is operated at high excess capacity.

As mentioned above, the cooling capacity of the coil 22 is adjusted by evaporating a selected portion of refrigerant in the evaporator 45 by heat supplied from the heater 47. An adjustable power supply, such as a variable transformer 54, operating off line current provides a manually selectable voltage or current supply to the capacity reducing heater 47. The voltage applied to the heater 47 is also applied, via a full-wave rectifier 55 and a voltage divider 56 to the indicating meter 51. The polarity of the direct current supplied to the meter 51 from the variable transformer 54 is opposed to the polarity of the voltage generated by the thermocouples 52 and 53. Accordingly, the indicating meter 51 will respond to a net current flow that represents the difference between the gross cooling capacity of the refrigeration system 40 and the artificial load or loss in cooling capacity caused by the reducing heater 47. It will thus be seen that the visual indicator 51 will indicate the available cooling capacity for use in the refrigeration evaporator 22 within the thermal control unit 20.

As the required system adjustment for any particular research project can be related or determined in terms of the heat gain or thermal load of the project, I find it particularly advantageous to calibrate the visual indicator 51 in heat units such as B.t.u.'s or K.cal. Cooling capacity to handle the load thus can easily be selected merely by adjusting the variable transformer 54 until the particular thermal load is shown on the indicator 51. It is desirable however to allow a slight margin of over-capacity as a safety factor. The slight over-capacity is opposed in the thermal control unit 20 by the vernier heater 23.

As mentioned above, operation of the vernier heater 23 is controlled by the variable datum thermostat or transducer 28. Circuitry 60 for providing this control, is shown in the drawing with the transducer 28 and the heater 23 displaced from the control unit 20 for ease of understanding. The transducer 28 shown, is a simple bi-metallic strip 28a having a mechanically adjustable abutment or datum selector 28b. The transducer 28 is in a low current circuit 61 including a ballast resistance 62 and the coil of a relay 63. The transducer 28 thus operates the relay 63 that controls a high current circuit 64 containing the infrared water heater 23. Thus, if the temperature sensed by the transducer 28 is below the desired temperature, as selected by the manual datum adjustment 28b, the relay 63 will operate, complete the circuit 64 and heat will be added by infrared radiation to the vortex 12a to raise its temperature. While the circuitry shown for this fine or vernier control of the liquid temperature is rather elemental, it will be appreciated that a more sophisticated system could be employed to achieve even more stable and hence accurate results. For example, a proportional control system could be employed as opposed to the simple on-off system shown in this illustrative embodiment.

If a research project requires the maintenance of a time-temperature schedule, as opposed to a simple constant temperature, it is merely necessary to operate the datum adjustment 28b by suitable clock or timing mechanisms. For extreme accuracy it may be necessary to also adjust, as a function of time, the cooling capacity adjustment transformer 54. However, inasmuch as my thermal control unit 20 permits the controller to employ an extremely small circulating volume or thermal mass, adjustment of the datum abutment 28b, will provide sufficient accuracy for the vast majority of research projects.

To this point, a circulating liquid thermal environmental controller has been described that delivers a flow of thermally accurate liquid 12 to be circulated directly in a scientific instrument, such as the pH meter 30 shown. I have observed, however, that it is often necessary to cool or otherwise control the temperature of an amount of liquid that is much too large to be circulated through a controller that is designed to handle most research jobs. Also there are situations wherein a large body of chemically active liquid must have a controlled temperature. For such applications I have devised a remote heat exchange device or attachment 70 (see FIGURE 2), for use with my standard size controller. The remote heat exchange device 70 is constructed substantially identical to the thermal control unit 20 employed in the reservoir 10 of my main controller and thus includes an elongated vertically extending enclosing shell or vortex chamber 71, a cooling coil 72, an infrared vernier heater 73, a circulating pump 74, a return inlet 75, an outlet duct 76 having a main outlet 77 and a secondary outlet 78 that contains a transducer 79 which is operatively connected to the vernier heater 73 by circuitry 80 that is substantially similar to the circuitry 60 shown in FIGURE 1. The cooling coil 72 carries a controlled temperature circulating supply of liquid 12 from the delivery conduit 14 of my main controller. The flow patterns and vernier temperature control of the heat exchange device 70 are thus substantially the same as in my main thermal control unit 20. Accordingly thermal heat lags and gradients induced by poor heat transfer and mixing efficiency are avoided at the point of liquid utilization and the temperature of even large masses of liquid can be accurately maintained.

Those skilled in the art will recognize that I have provided a circulating liquid thermal environmental controller that is capable of a high degree of accuracy and constancy as well as being relatively simple in construction, durable in operation and versatile in application. It will further be recognized that I have provided an instrument that is extremely convenient to use and is capable of accurately reproducing critical experimental conditions because of the highly accurate cooling capacity control and indicating mechanism that is made possible by my novel dual evaporator concept.

Having thus described my inventive concepts and an illustrative embodiment thereof, I claim:

1. Environmental control apparatus comprising:
   (A) a thermally insulated reservoir for holding a pool of thermal control liquid,
   (B) refrigeration means for removing heat from liquid within said reservoir, said refrigeration means comprising hermetically sealed flow passage means containing an evaporable refrigerant, said flow passage means including, in serial flow communication,
(1) means for compressing said refrigerant,
(2) heat rejection means for condensing said refrigerant,
(3) refrigerant expansion means for controlling the amount of liquified refrigerant flowing therepast,
(4) a cooling capacity adjustment evaporator, and
(5) a refrigeration evaporator that is positioned in heat exchange relationship with liquid within said reservoir, and
(C) adjustable means for adding heat at a controlled rate to said cooling capacity adjustment evaporator.

2. Environmental control apparatus comprising a thermally insulated reservoir for holding a pool of thermal control liquid, a thermal control unit positioned within said reservoir, said thermal control unit having an elongated enclosing shell that surrounds longitudinally extending cooling means, pump means for delivering liquid tangentially into one end of said enclosing shell to establish a longitudinally moving agitated flow of liquid therethrough, means adjacent the other end of said shell for discharging liquid into said reservoir, and means for heating liquid passing through said enclosing shell, said heating means emanating heat principally in the form of infrared heat energy.

3. Environmental controller apparatus as defined in claim 2 wherein said means for adding heat to said cooling capacity adjustment evaporator comprises, an electrical heating element having a manually adjustable current supply.

4. Environmental control apparatus comprising a thermally insulated reservoir for holding a pool of thermal control liquid, a thermal control unit positioned within said reservoir, said thermal control unit having an elongated enclosing shell that surrounds longitudinally extending cooling means, pump means for delivering liquid tangentially into one end of said enclosing shell to establish a longitudinally moving agitated flow of liquid therethrough, said liquid delivering means comprising a circulating pump having a main outlet and a by-pass outlet, said main outlet delivering a flow of circulating liquid externally of said reservoir to a remote load, said by-pass outlet fluidly connected to deliver a portion of the pump output tangentially into said shell, and a circulating return flow line receiving liquid from said load and delivering it into said shell adjacent said by-pass flow and at an angle thereto, said circulating pump having an inlet that receives liquid from said reservoir, means adjacent the other end of said shell for discharging liquid into said reservoir, and means for heating liquid passing through said enclosing shell.

5. Environmental control apparatus comprising a thermally insulated reservoir for holding a pool of thermal control liquid, a thermal control unit positioned within said reservoir, said thermal control unit having an elongated enclosing shell that surrounds longitudinally extending cooling means, said cooling means comprising a refrigeration evaporator that is part of a refrigeration system having means forming a hermetically sealed flow passage for an evaporable refrigerant, said flow passage including, in serial flow communication,
(A) means for compressing said refregireant,
(B) heat rejection means for condensing said refrigerant,
(C) refrigerant expansion means for controlling the flow of evaporable refrigerant therepast,
(D) a cooling capacity adjustment evaporator, and
(E) said cooling means, and
selectively controllable heater means for evaporating a portion of the vaporizable refrigerant flowing in said cooling capacity adjustment evaporator for limiting the available liquid refrigerant supplied to said cooling means, pump means for delivering liquid tangentially into one end of said enclosing shell to establish a longitudinally moving agitated flow of liquid therethrough, means adjacent the other end of said shell for discharging liquid into said reservoir, and means for heating liquid passing through said enclosing shell.

6. Environmental control apparatus as defined in claim 5 wherein said means for supplying heat to said cooling capacity adjustment evaporator comprises an electrical heating element having a manually adjustable current supply.

7. Environmental control apparatus as defined in claim 6 further comprising means for indicating the instantaneous available cooling capacity of said cooling means, said indicating means having a current responsive visual indicator, means responsive to the gross cooling capacity of said refrigeration system for applying a first direct voltage to said visual indicator that is a function thereof, and means responsive to the current supply to said evaporator heat supply means for applying a second direct voltage to said visual indicator in opposition to said first voltage whereby a net current flow through said visual indicator will indicate instantaneous available cooling capacity of said cooling means.

8. Environmental control apparatus as defined in claim 7 wherein said visual indicator is calibrated in heat units.

References Cited by the Examiner

UNITED STATES PATENTS

| | | | |
|---|---|---|---|
| 2,127,732 | 8/1938 | Heitman | 62—394 X |
| 2,133,966 | 10/1938 | Buchanan | 62—115 |
| 2,244,376 | 6/1941 | Spofford | 62—225 X |
| 2,691,273 | 10/1954 | Kramer | 62—513 X |
| 2,948,125 | 8/1960 | Lawler | 62—216 X |
| 2,991,981 | 7/1961 | Anderson | 165—119 X |
| 2,994,514 | 8/1961 | Brown | 165—26 |

ROBERT A. O'LEARY, *Primary Examiner.*